A. J. CHAMBERLAIN

Sept. 29, 1931. CAN CLOSING MACHINE Re. 18,209

Original Filed Nov. 26, 1926

INVENTOR
Alfred J. Chamberlain.

BY

ATTORNEY

Reissued Sept. 29, 1931 Re. 18,209

UNITED STATES PATENT OFFICE

ALFRED J. CHAMBERLAIN, OF MILWAUKEE, WISCONSIN

CAN CLOSING MACHINE

Original No. 1,788,659, dated January 13, 1931, Serial No. 150,654, filed November 26, 1926. Application for reissue filed August 1, 1931. Serial No. 554,558.

This invention relates to portable can closing machines especially designed for use in applying covers or closures to cans and clamping or bending flanges or lugs on the covers into engagement with beads or flanges on the neck of the can.

One of the principal objects of the invention is to provide a machine of this character which is portable in that it is adapted to be carried from can to can and successively used on the cans to secure the covers to the cans in such manner as to close and seal the cans and which is so constructed and organized that the operator of the machine may lift or carry the machine from can to can and easily and quickly operate it to secure the covers to the cans without changing his grip on the machine.

Another object is to provide a portable can closing machine having those advantages and capacities and which while being of simple and durable construction, is positive, reliable and convenient in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1:
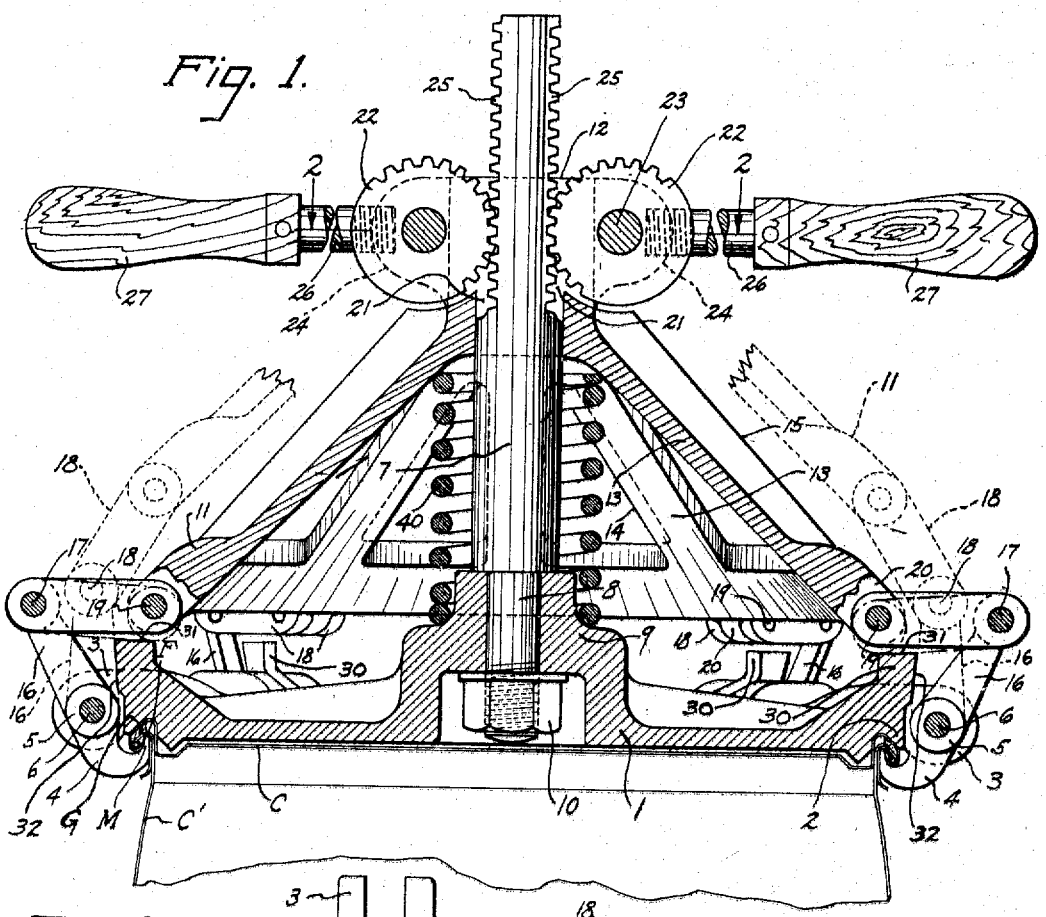
Figure 1 is a view partly in diametrical vertical section and partly in side elevation showing a portable can closing machine embodying the present invention.
Figure 2:
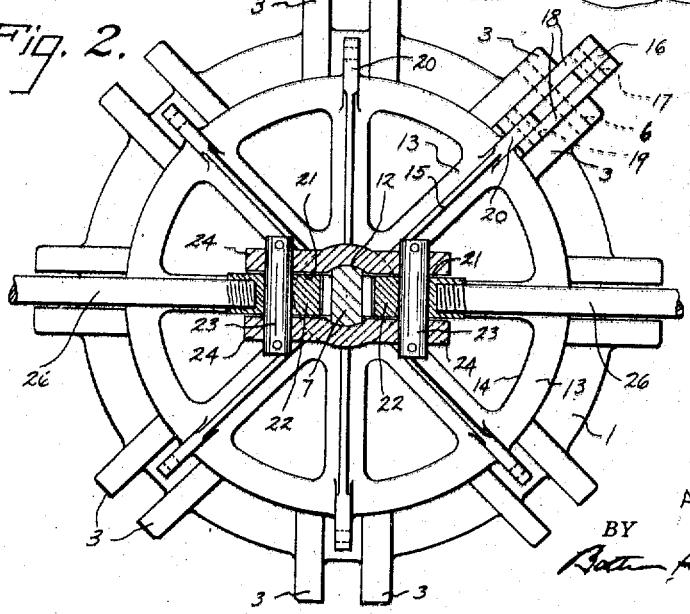
Figure 2 is a view partly in plan and partly in section on line 2—2 of Fig. 1, with certain of the parts omitted for the sake of simplicity in illustration.

Referring to the drawings wherein for the sake of illustration is shown one embodiment of the invention, it will be seen that the portable can closing machine comprises a head 1 having the form of a plate and provided around its periphery with a passive die 2. All around the upper and outer portion of the periphery of the head 1, pairs of apertured pivot ears 3 are provided and on these pairs of pivot ears 3, active dies 4 are pivotally mounted, the dies 4 having apertured hubs 5 receiving pivot pins 6 passing through the apertures of the hubs and the apertures of the associated pairs of ears.

A fixed mounting shaft 7 is carried by the head, the shaft 7 having a reduced lower end 8 received in an apertured boss 9 provided therefor on the head 1. A nut 10 is threaded on the reduced end 8 of the shaft 7 and is engaged with the head 1 or with a washer interposed between the nut 10 of the head 1 for the purpose of securing the mounting shaft 7 fixed on and rigid with the head 1. As shown in the drawings, the nut 10 is received in a recess provided therefor in the head.

An actuating member designated generally at 11 is provided and has a bearing portion 12 of tubular form, the bearing portion 12 being slidably fitted on the shaft 7. This actuating member also has a downwardly and outwardly extending or flaring body portion 13 which may be recessed or cut away as at 14 to lighten it, and ribbed as at 15 to strengthen it. As shown, the actuating member is of substantially conical form.

Motion transmission means is provided for actuating the active die members from the actuating member and this motion transmission means preferably comprises toggles between the lower enlarged end of the actuating member and the active dies. Each toggle preferably comprises an arm 16 integral with or otherwise suitably fixed to the hub 5 of its active die 4, the arm 16 extending upwardly from the hub 5 of its active die 4 and having its upper end pivotally connected as at 17 to one end of each member of a pair of toggle links 18, the other end of each member of the pair of toggle links 18 being pivotally connected as at 19 to an apertured pivot ear 20 integrally formed with the lower enlarged end of the body portion 15 of the actuating member 11. It is to be understood that one such toggle mechanism is provided between the actuating member and each active die.

The bearing portion 12 of the actuating member is provided with diametrically opposite and longitudinally extending slots 21 in which a pair of gear elements, preferably gear segments 22 are operatively fitted, each gear segment being pivotally connected as at 23 to lugs 24 integrally formed with the bearing portion 12 and extending downwardly beyond the slots 12. The gear segments 22 have teeth meshing with the teeth of opposed racks 25 formed in the upper end of the fixed shaft 7. A combined operating member and handle 26 is fixed to each gear segment 22 and projects radially therefrom, the outer end of each combined operating member and handle 26 being provided with a hand grip 27.

For the purpose of limiting the movement of the actuating member 11, the toggles 16, 18 and the active dies 4, stops 30 are integrally formed with the head 1 adjacent the ears 3 and have faces 31 engageable with the links 18 and faces 32 engageable with the arms 16.

Figure 3:
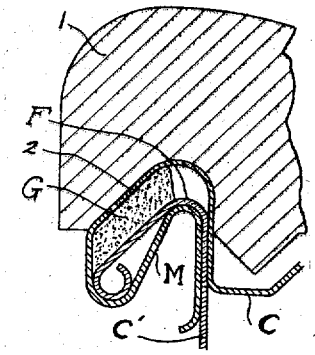
Figure 3 is a fragmentary detail sectional view showing one way in which the cover may be sealed on the can.

As shown in Figures 1 and 3, the portable can closing machine is employed for applying a cover C to a can C′ and bending in under a bead or flange F of the can a suitable engaging member or members M on the cover. Usually a gasket G is interposed between the rim of the cover and the rim or bead of the can. Before using the portable can closing machine constituting the present invention, covers are placed in position on the cans and the machine is then brought to bear successively on the cans. In applying the machine to the cans the head 1 is placed against the body of the cover C, as shown in Fig. 1, and in such position the passive die 2 engages the rim of the cover and the active dies 4 are positioned to be engageable with the engaging member M of the cover. At such time the actuating member 11, links 18 and arms 16 are positioned as shown in dotted lines in Figure 1, the actuating member being pulled upon the shaft 7, the links 18 being only slightly inwardly inclined from the vertical and the arms 16 being held substantially vertical by virtue of their engagement with the faces 32 of the stops. In handling the machine the operator grips the grips 27 which are disposed vertically and in proximity to each other when the machine is being handled or carried from can to can. After being placed on a can cover the grips are spread apart and pressed downwardly whereby the gear segments are rotated about their axes and are caused to roll down along their racks 25. The rolling of the gear segments advances the actuating member 15 downwardly and the downward movement of the actuating member 15 is transmitted in a positive, direct and forceful manner and with mechanical advantage to the active dies which bend the engaging members M of the cover into closing and sealing engagement with the under side or rim or bead of the can. The combined operating and handle members together with the gears, rack and actuating member enable a powerful and positive actuating force to be transmitted to the dies with an easy and convenient movement on the part of the operator. This effective and desirable action is contributed to and enhanced by the feature of having the elongated and downwardly and outwardly flaring actuating member which permits of the use of short rigid links between the actuating member and the arms of the active dies. It is to be noted that the elongated and downwardly and outwardly flaring actuating member enables the relatively short links 18 to be disposed at a relatively small angle with respect to the horizontal during the final phases of the bending or crimping so that they exert a powerful outward thrust on the arms 16 at such time. Moreover, this organization permits the links 18 to swing past the horizontal or dead center position with a self-locking effect whereby not only are the parts held in adjusted position, but also the operator is advised that the operation has been completed. The movement of the links 18 to a position just past the dead center is limited by the engagement of the links 18 with the faces 31 of the stops 30. Figure 1 illustrates in full lines the position of the links 18 in horizontal dead center position and in dot-and-dash lines the self-locking position of the links just past dead center.

Preferably a spring 40 is provided and encircles the mounting shaft 7, the spring 40 having its lower end abutting the boss 9 and having its upper end engageable with the under side of the bearing portion 12 of the actuating member 11. This spring 40 is tensioned to tend to cause the actuating member to move upwardly on the shaft 7 thereby tending to maintain the handles 27 approximately to each other and the active dies 4 in idle or inactive position. This spring 40 is of such size and strength and so tensioned that it does not offer any material resistance to the operation of the device when the handles 27 are swung outwardly and downwardly as described.

While the invention as shown and described as being especially designed and adapted for use in a portable can closing machine, it is to be understood that it may be embodied in various types of can closing machines and especially in a can closing machine of the base and pedestal type. This universal adaptability is especially true of the features and advantages inherent in the conical actuating member and the short slightly angled links between the guiding member and the active dies.

While but one embodiment of the invention has been shown and described, of course, various changes may be made in the size, shape and arrangement of the parts without departing from the spirit of the invention or the scope of the claims.

The invention claimed is:

1. A portable can closing machine comprising a head carrying a passive die, active dies pivoted to the head, a mounting shaft fixed to and extending upwardly from the head, an actuating member having a bearing portion slidably mounted on the shaft, and a body portion extending downwardly and outwardly from the bearing portion, motion transmission means between the lower end of the body portion and the active dies, racks on the shaft, said bearing portion having opposed slots, gear segments operating in said slots and rotatably mounted on the bearing portion, and combined handles and operating members fixed to said gear segments.

2. A can closing machine comprising cooperating dies, an actuating member having a portion of substantially conical form and toggles between the large end of the conical portion of said actuating member and certain of the dies, said toggles including relatively short links connected to the actuating member, said links being slightly angled from the horizontal in the final phases of the operation.

3. A can closing machine comprising cooperating dies, an actuating member having a portion of substantially conical form and toggles between the large end of the conical portion of said actuating member and certain of the dies, said toggles including relatively short links connected to the actuating member.

4. A can closing machine comprising cooperating dies, an actuating member having a portion of substantially conical form and toggles between the large end of the conical portion of said actuating member and certain of the dies, said toggles including links connected to the actuating member, said links being slightly angled from the horizontal in the final phases of the operation and being swingable to a self-locking position just past dead center as the operation is completed.

5. A can closing machine comprising a head carrying a passive die, active dies pivoted to the head, a shaft fixed to and extending upwardly from the head, an actuating member having a tubular bearing portion slidably receiving said shaft and having a flaring body portion extending downwardly and outwardly from said tubular bearing portion, substantially upright arms fixed to the pivoted dies, and links between the lower large end of the actuating member and the arms, said links being angled only slightly with respect to the horizontal during the final phases of the operation.

6. A portable can closing machine comprising a head carrying a passive die, active dies pivoted to the head, a mounting shaft fixed to and extending upwardly from the head, an actuating member having a bearing portion slidably mounted on the shaft and a body portion extending downwardly and outwardly from the bearing portion, toggles between the lower end of the body portion and the active dies, said toggles including arms connected with the active dies and links between the arms and the lower end of the body portion, stops carried by the head and having faces engageable with the arms and faces engageable with the links whereby to limit the movement of the actuating member, toggles and active die assembly in either direction, and means for shifting the actuating member along its mounting shaft.

7. A portable can closing machine comprising a head carrying a passive die, active dies pivoted to the head, a mounting shaft fixed to and extending upwardly from the head, an actuating member having a bearing portion slidably mounted on the shaft and a body portion extending downwardly and outwardly from the bearing portion, toggles between the lower end of the body portion and the active dies, said toggles including arms connected with the active dies and links between the arms, stops carried by the head and operable to limit the movement of the actuating member, toggles and active dies, and means for shifting the actuating member along the mounting shaft.

8. A portable can closing machine comprising a head carrying a passive die, active dies pivoted to the head, a mounting shaft fixed to and extending upwardly from the head, an actuating member having a bearing portion slidably mounted on the shaft and a body portion extending downwardly and outwardly from the bearing portion, toggles between the lower end of the body portion and the active dies, said toggles including arms connected with the active dies and links between the arms, stops carried by the head and operable to limit the movement of the actuating member, toggles and active dies, and means for shifting the actuating member along the mounting shaft and comprising racks formed on the shaft, gear segments pivotally mounted on the actuating member and cooperable with the racks, and combined handles and operating members fixed to said gear segments.

9. A portable can closing machine for use in securing a cover to a can and comprising a head plate adapted to engage the cover of a can, dies pivoted on said head plate, a mounting shaft structure having its lower end secured to the plate and extending upwardly from the plate and provided with fixed racks on its opposite faces, a die actuating member having a bearing portion slidably mounted on the shaft structure and having a body portion extending outwardly from the bearing portion, links connecting the lower end of the body portion and said dies, gear elements rotatably mounted on the actuating member and meshed with the racks to roll therealong and combined handles and operating members fixed at their inner ends to the gear elements and extending radially therefrom and operable when spread to actuate the dies and when moved toward each other to retract the dies and facilitate the transportation of the machine from one can to another.

10. A can closing machine comprising a base adapted to engage with the can cover, a double rack extending upwardly from the base, a sleeve slidably mounted on said rack, jaws pivotally mounted around the base and adapted to coact therewith for closing the cover, links pivoted to the jaws and to the sleeve, brackets on said sleeve, gears pivoted in said brackets and engaging with the racks, and hand levers secured to the gears.

In testimony whereof, I hereto affix my signature.

ALFRED J. CHAMBERLAIN.